March 10, 1931.                H. C. POTTER                1,795,674
                    CONNECTER FOR NECKLACES AND THE LIKE
                            Filed July 16, 1930

Inventor
Herbert C. Potter
By
Attorney

Patented Mar. 10, 1931

1,795,674

UNITED STATES PATENT OFFICE

HERBERT C. POTTER, OF BROOKLYN, NEW YORK, ASSIGNOR TO J. A. DEKNATEL AND SON, INC., OF NEW YORK, N. Y., A CORPORATION OF NEW YORK

CONNECTER FOR NECKLACES AND THE LIKE

Application filed July 16, 1930. Serial No. 468,375.

This invention relates to a fastener or connecting device for the separable ends of a necklace or string of beads and the like.

An object of the invention is to provide a rigidly constructed swivel connection for the ends of the string, the connection being incorporated and located in body members which are two of the beads of the spring.

A still further object is to provide a fastening device that will constitute a positive and reliable connection of rigid construction.

With these and other objects in view the invention consists of certain novel features of construction, as will be more fully described and particularly pointed out in the appended claims.

In the accompanying drawings

The improved fastener consists of a stud or male body member B′ and a socket or female member B², each provided with a loop or eyelet 21 and 27 respectively for attachment to the end of a string S upon which are positioned the beads B.

Figure 4:
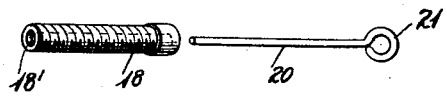
Figure 4 is a perspective view of the hollow threaded stud and its associated swivel pin.

The body of the stud member B′, as well as the member B², may be constructed of material similar to or different from that of the other beads of the string and may be of glass, fused enamel or other materials and may be of the same shape and design as the other beads of the string or of any desired shape and design. Extending axially through this member is an opening 16. Fitted into this opening, so as to provide a non-rotatable fit is a hollow externally threaded stud 18. It is to be noted that this stud extends beyond the confines of the body B′ to form a projecting end 19. As indicated the stud is hollow, that is to say, has extending throughout its entire length an aperture 18′. Positioned and loosely retained within this aperture is the shank of a long swivel pin 20, Figure 4. The pin is retained in position by the provision of the eye or loop 21 at one of its ends and is headed as at 22 at its opposite end. So constructed, the body of the member B′ and its stud 18 is freely rotatable about the shank of the pin 20 as an axis and forms in effect a swivel connection with the string S.

Figure 1:
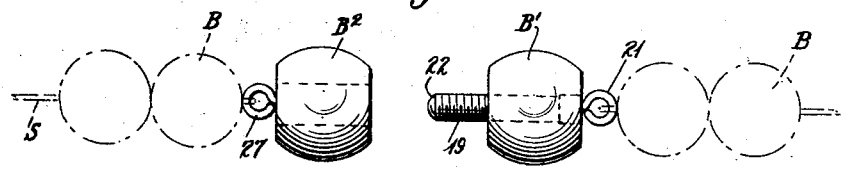
Figure 1 is an elevation of the connecter, the ends of the bead necklace being shown in dotted lines.
Figure 2:
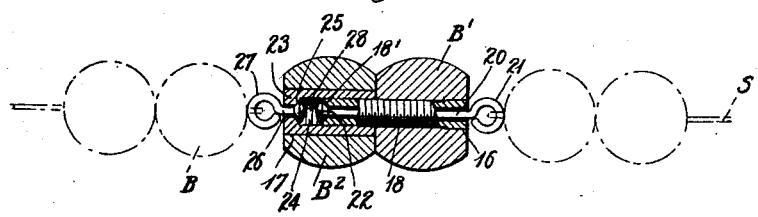
Figure 2 is a sectional view of the fastener with the body parts connected.
Figure 3:
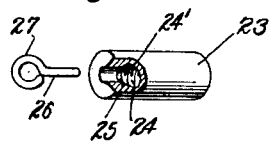
Figure 3 is a perspective view partly in section of the socket portion of the device and its associated swivel pin.

The body of the socket member B² is also constructed of the same material as the other beads and similarly to B′ has extending axially therethrough an aperture 17, of somewhat larger diameter than 16. Positioned within this aperture to also provide a non-rotatable fit is the socket 23. This socket, see Fig. 3, is provided with an opening 24 throughout its length. This opening however is not of uniform diameter, being wider throughout that portion which is adapted to receive the projection 19. By reference to Figs. 2 and 3 it will be understood that the narrow part of the opening 24 forms with the wider portion a seat 25, the purpose of which will be presently explained. The stud receiving section of the socket is internally threaded as indicated at 24′.

A short swivel pin 26 is loosely maintained within that portion of the aperture 17 of lesser width. The pin is headed as at 28 and rests upon the seat 25 of the socket member. The opposite end of the pin 26 has an eyelet or loop 27. So constructed the body of the socket member B² and the socket 23 are rotatable about the shank of the pin 26 as an axis.

It is to be noted that the threaded portion 24′ of the socket 23 is of greater length than the projecting threaded end 19 of the stud 18. This permits the exposed end of the stud to be inserted into the opening of the socket and by relative rotation of the members B′ and B² to be retained therein. In order to prevent the connection from coming disconnected it is merely necessary to rotate the members B′ and B² relative to each other until they are in firm frictional contact as shown in Fig. 2.

Having thus described my invention, it will be apparent that I have provided a fas- tener well adapted for the objects above enumerated. It will be understood that I may resort to various mechanical deviations from that described above, being limited only by the scope of the appended claims.

I claim:

1. A connecter for necklaces and the like comprising a body member, an internally threaded socket member non-rotatably embedded in said body member, a seat in said socket member, a swivel retained by said seat and extending outwardly from said members, a threaded stud member adapted to fit within said socket member, and a second swivel extending outwardly from said stud member.

2. A connecter for necklaces and the like comprising a bead of non-threadable material, an internally threaded socket member non-rotatably embedded in said bead, a seat within said socket member, a swivel loosely retained at one end by said seat and having its other end extending beyond the bead, a threaded stud member adapted to fit within said socket member, and a second swivel attached to said stud member and extending outwardly therefrom.

3. A connecter for necklaces and the like comprising a body member, an internally threaded socket member non-rotatably embedded in said body member, a seat in said socket member, a swivel retained by said seat and extending outwardly from said members, a second body member, a stud member non-rotatably embedded in said second body member and having a threaded projection beyond one side of said second body member adapted to fit into said socket member, and a second swivel extending outwardly from the side of said second body member opposite said projection.

4. A connecter for necklaces and the like comprising a bead of non-threadable material, an internally threaded socket member non-rotatably embedded in said bead, a seat within said socket member, a swivel loosely retained at one end by said seat and having its other end extending beyond the bead, a second bead of non-threadable material, a stud member non-rotatably embedded in said second bead and having a threaded projection beyond one side of said second bead adapted to fit into said socket member, and a second swivel extending outwardly from the side of said second bead opposite said projection.

5. A connecter for necklaces and the like comprising a bead of non-threadable material, an internally threaded socket member non-rotatably embedded in said bead and flush with the opposite sides thereof, a seat within said socket member adjacent one end thereof, a swivel loosely retained by said seat and extending outwardly from the bead, a threaded stud member adapted to fit within said socket member, and a second swivel extending outwardly from said stud member.

6. A connecter for necklaces and the like comprising a bead of non-threadable material, an internally threaded socket member non-rotatably embedded in said bead and flush with the opposite sides thereof, a seat within said socket member adjacent one end thereof, a swivel loosely retained by said seat and extending outwardly from the bead, a second bead of non-threadable material, an apertured stud embedded in said second bead and having a threaded projection extending beyond one side of the latter, said projection being adapted to fit into said socket member, and a second swivel loosely retained in the aperture of said stud and extending outwardly from the side of said second bead opposite said projection.

7. A connecter for necklaces and the like comprising a bead of non-threadable material, an apertured stud non-rotatably embedded in said bead having one end thereof flush with one side of the bead and having a threaded projection extending beyond the opposite side of the bead, a swivel loosely retained in the aperture of said stud and extending beyond the first-mentioned side of said bead, an internally threaded socket member adapted to receive said projection, and a second swivel extending outwardly from said socket member.

8. A connecter for necklaces comprising a bead having an aperture extending axially therethrough, a socket member seated within the aperture, said socket member being partially threaded, a seat within the socket member, a swivel pin loosely retained by the seat and extending beyond the bead, and another bead having a threaded projection, a second swivel pin retained within the projection and extending beyond said other bead, the projection adapted to seat within the threaded portion of the socket.

In testimony whereof, I affix my signature.

HERBERT C. POTTER.